(12) United States Patent
Bapat (10) Patent No.: US 8,752,039 B1
(45) Date of Patent: Jun. 10, 2014

(54) DYNAMIC UPGRADE OF OPERATING SYSTEM IN A NETWORK DEVICE

(75) Inventor: Vinay Bapat, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 1047 days.

(21) Appl. No.: 12/543,940

(22) Filed: Aug. 19, 2009

(51) Int. Cl.
 *G06F 9/44* (2006.01)

(52) U.S. Cl.
 USPC .......................................................... 717/171

(58) Field of Classification Search
 None
 See application file for complete search history.

(56) References Cited

U.S. PATENT DOCUMENTS

| | | | | |
|---|---|---|---|---|
| 6,128,734 | A * | 10/2000 | Gross et al. | 713/100 |
| 2002/0073304 | A1 * | 6/2002 | Marsh et al. | 713/1 |
| 2007/0283343 | A1 * | 12/2007 | Aridor et al. | 717/174 |
| 2009/0327479 | A1 * | 12/2009 | Zavalkovsky et al. | 709/224 |

\* cited by examiner

*Primary Examiner* — Henry Tsai
*Assistant Examiner* — Juanito Borromeo
(74) *Attorney, Agent, or Firm* — Harrity & Harrity, LLP (57) ABSTRACT

An upgrade procedure may be executed at a network device to allow the network device to automatically upgrade an operating system to a new operating system. The upgrade procedure may include receiving a bootable image file of an upgrade operating system that is different from an operating system being run by the network device and which uses a file system format that is different from the file system format of the operating system being run by the network device. The bootable image file includes a binary file format that conforms to the file system format used by the upgrade operating system. The network device allocates contiguous space on a drive of the network device and copies the bootable image file to the contiguous space. The network device also modifies a master boot record of the drive such that the contiguous space on the drive is reflected in the master boot record as a bootable partition of the drive.

22 Claims, 10 Drawing Sheets

DYNAMIC UPGRADE OF OPERATING SYSTEM IN A NETWORK DEVICE

BACKGROUND

Network devices can provide a variety of network control or connection functions in a network. For example, routers may forward data units through a network, firewalls may provide security services, and gateways may be used to separate portions of a network.

One particular type of network device is known as a WAN (wide area network) accelerator. WAN accelerators may be used to improve the performance of wide area networks. WAN accelerators are typically installed by administrators at a number of locations. For example, the main office WAN accelerator may be connected to multiple branch office WAN accelerators, or a branch office WAN accelerator may also be connected to various other offices via counterpart WAN accelerators. WAN accelerators may use a number of technologies, such as data compression, data prefetching and caching, application-specific acceleration, and/or policy-based bandwidth allocation to improve the perceived performance of the WAN for the locations at which the WAN accelerators are installed.

Manufacturers of network devices, such as WAN accelerators or other network devices, may occasionally release upgraded software for their network devices. It is desirable that users that have purchased the network devices be able to take advantage of the upgraded software with as little disruption as possible of the normal operation of the network device. This can be a particularly difficult goal when the software upgrade may be subject to cycles in which the manufacturer of the device would like to replace the operating system of the device.

SUMMARY

According to one implementation, a software upgrade method performed by a network device may include receiving, at a processor associated with the network device, a bootable image file of an upgrade operating system that is different from an operating system being run by the network device and which uses a file system format that is different from the file system format of the operating system being run by the network device. The bootable image file may include a binary file format that conforms to the file system format used by the upgrade operating system. The method may further include allocating, by the processor associated with the network device, contiguous space on a drive of the network device, the contiguous space having a size at least equal to the size of the bootable image file and the drive being formatted according to the file system format of the operating system being run by the network device. The method may further include copying, by the processor associated with the network device, the bootable image file to the contiguous space on the drive of the network device and modifying, by the processor associated with the network device, a master boot record of the drive such that the contiguous space on the drive is reflected in the master boot record as a bootable partition of the drive. Still further, the method may include causing, by the processor associated with the network device, the network device to reboot to load the upgrade operating system.

In another possible implementation, a computer-readable medium may contain instructions executable by a network device. The computer-readable medium may include one or more instructions to receive a bootable image file of an upgrade operating system that is different from an operating system being run by the network device and which uses a file system format that is different from the file system format of the operating system being run by the network device, the bootable image file including a binary file format that conforms to the file system format used by the upgrade operating system. The computer-readable medium may further include one or more instructions to allocate contiguous space on a drive of the network device, the contiguous space having a size at least equal to the size of the bootable image file and the drive being formatted according to the file system format of the operating system being run by the network device; and one or more instructions to copy the bootable image file to the contiguous space on the drive of the network device. Still further the computer-readable medium may include one or more instructions to modify a master boot record of the drive such that the contiguous space on the drive is reflected in the master boot record as a bootable partition of the drive; and one or more instructions to cause the network device to reboot to load the upgrade operating system.

In another possible implementation, a network device may include network device hardware to process data units received by the network device and output the processed data units; a processor; and a drive to store, in non-volatile memory, instructions. The instructions may be for execution by the processor and may include: instructions to receive a bootable image file of an upgrade operating system that is different from an operating system being run by the network device; instructions to copy the bootable image file as a contiguous file on the drive; instructions to modify a master boot record of the drive such that the contiguous space on the drive is reflected in the master boot record as a bootable partition of the drive; instructions, executed as part of the upgrade operating system after rebooting of the network device, to create one or more new partitions on the drive; and instructions, executed as part of the upgrade operating system after rebooting of the network device, to reformat the one or more new partitions to use the file system format of the upgrade operating system.

BRIEF DESCRIPTION OF THE DRAWINGS

The accompanying drawings, which are incorporated in and constitute a part of this specification, illustrate one or more embodiments of the invention and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention. Instead, the scope of the invention is defined by the appended claims and equivalents.

As described herein, an upgrade procedure may be executed at a network device to allow the network device to upgrade its installed software. The upgrade may include the installation of a new operating system at the network device.

Exemplary Environment

Figure 1:
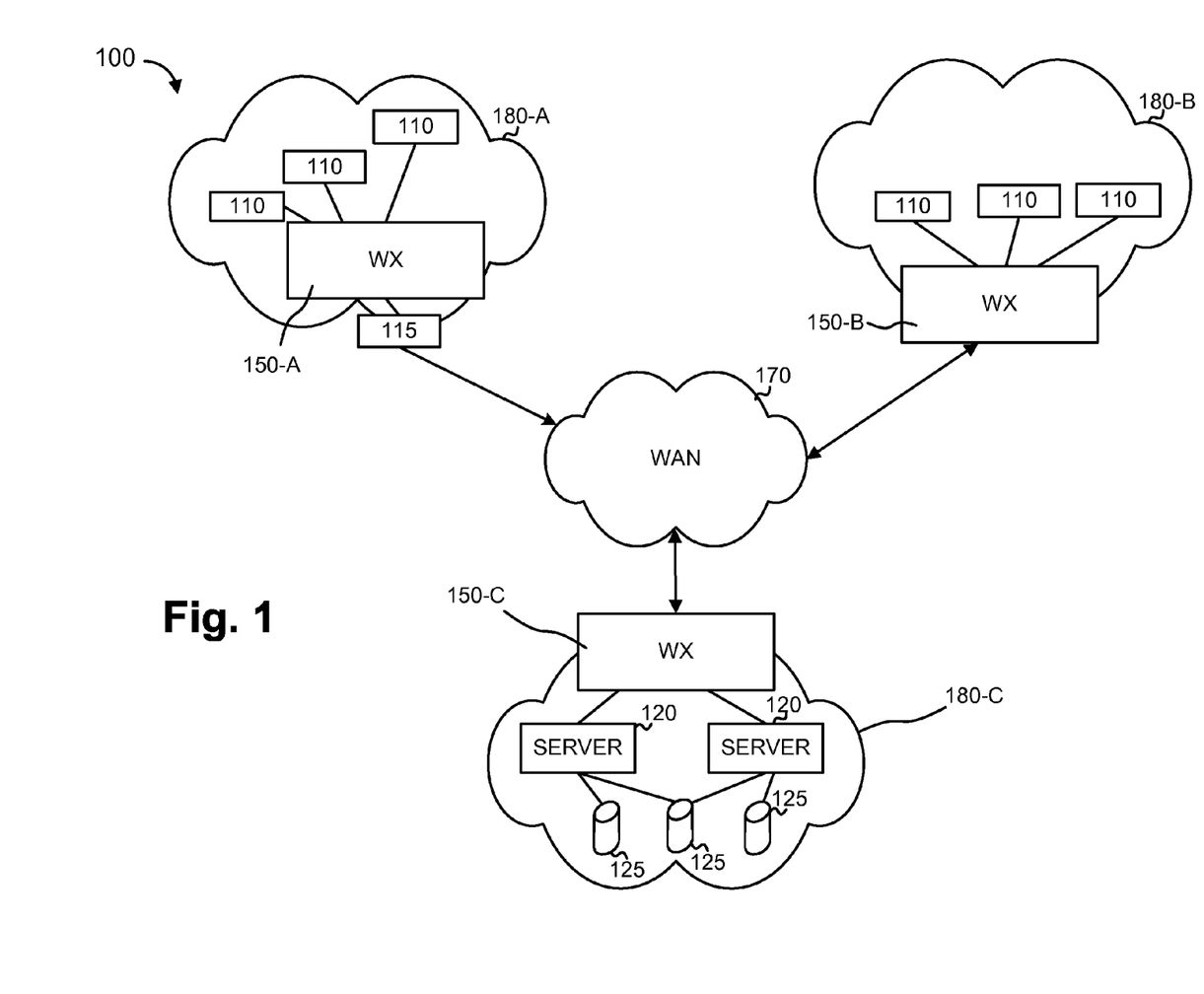
FIG. 1 is a diagram of an exemplary environment in which systems and methods, described herein, may be implemented.

FIG. 1 is a diagram of an exemplary environment 100 in which systems and methods, described herein, may be implemented. Environment 100 may include a wide area network (WAN) 170 and one or more private networks 180-A, 180-B, and 180-C (collectively referred to as private networks 180, and individually as private network 180). Private networks 180 may be geographically dispersed, and different private networks 180 may wish to communicate with one another over WAN 170. Private networks 180 may each, for example, be a local area network (LAN) for a branch office associated with a corporation or another entity. As another example, private networks 180-A and 180-B may be LANs for a corporate branch office, and private network 180-C may be a data center for the corporation.

WAN 170 may include a public network, such as the Internet, and may include a number of network devices, such as routers, switches, and/or gateways (not shown). In some implementations, WAN 170 may be implemented by privately owned or leased data lines between private networks 180, or by a combination of a public network and privately owned or leased data lines. In one implementation, data traffic between private networks 180 through WAN 170 may be characterized by one or more of increased cost, higher latency, or lower bandwidth than data traffic within a single corporate network 180. Accordingly, network applications accessing resources between a number of private networks 180 and across WAN 170 may tend to run less optimally than an application running locally at a private network 180.

Private networks 180 may each include a number of computing devices, such as, for example, endpoints 110, network security device(s) 115, servers 120, and databases 125. Endpoints 110 may include computing or communication devices of end-users, such as desktop computers, laptops, or mobile communication devices (e.g., cell phones or personal digital assistants (PDAs)). Network security devices 115 may include, for example, firewalls or other devices relating to network security. Servers 120 may include one or more devices designed to interact with and deliver information to other devices, such as endpoints 110. Databases 125 may include information repositories available on, for example, network 180-C. Servers 120 may, for example, serve data files or network applications to endpoints 110 over WAN 170. Servers 120 may interact with databases 125 when providing information to endpoints 110.

In the exemplary environment shown in FIG. 1, private networks 180-A and 180-B may be branch offices that include a number of endpoints 110, and private network 180-C may function as a data center that includes a number of servers 120, which may include file servers for private networks 180-A and 180-B. While FIG. 1 shows a particular number, configuration, and arrangement of private networks, in practice, there may be more, fewer, differently configured, and/or differently arranged private networks.

Private networks 180 may be associated with WAN acceleration devices (WXs) 150-A through 150-C (collectively referred to as WXs 150, and individually as WX 150). As shown in FIG. 1, for example, each of private networks 180-A through 180-C is associated with a corresponding WX 150-A, 150-B, and 150-C, respectively.

WXs 150 may include network devices designed to enhance the performance of applications running over WAN 170 between various ones of private networks 180. Each WX 150 may obtain adjacencies with other WXs 150. In other words, each WX 150 may automatically recognize adjacent (sometimes called "peer") WXs 150 and form logical connections to those adjacent WXs 150. The connection is called a "logical connection" because there may be a number of network devices (e.g., routers, switches, gateways, etc.) between them.

For example, assume that a user at one of endpoints 110 at private network 180-A would like to retrieve a file from a file server at private network 180-C. In this situation, WXs 150-A and 150-C may operate to decrease the latency and/or increase the bandwidth of WAN 170 by providing, for example, acceleration, data compression, data caching, and/or data prefetching services over WAN 170.

WXs 150 may each include software that controls the device. The software in WXs 150 may be upgradeable so that, when new software is released by the manufacture, WXs 150 may be able to automatically or under the direction of an administrator, be upgraded. In one implementation, and as particularly described herein, the software upgrade may include a change in the underlying operating system of the WXs.

Figure 2:
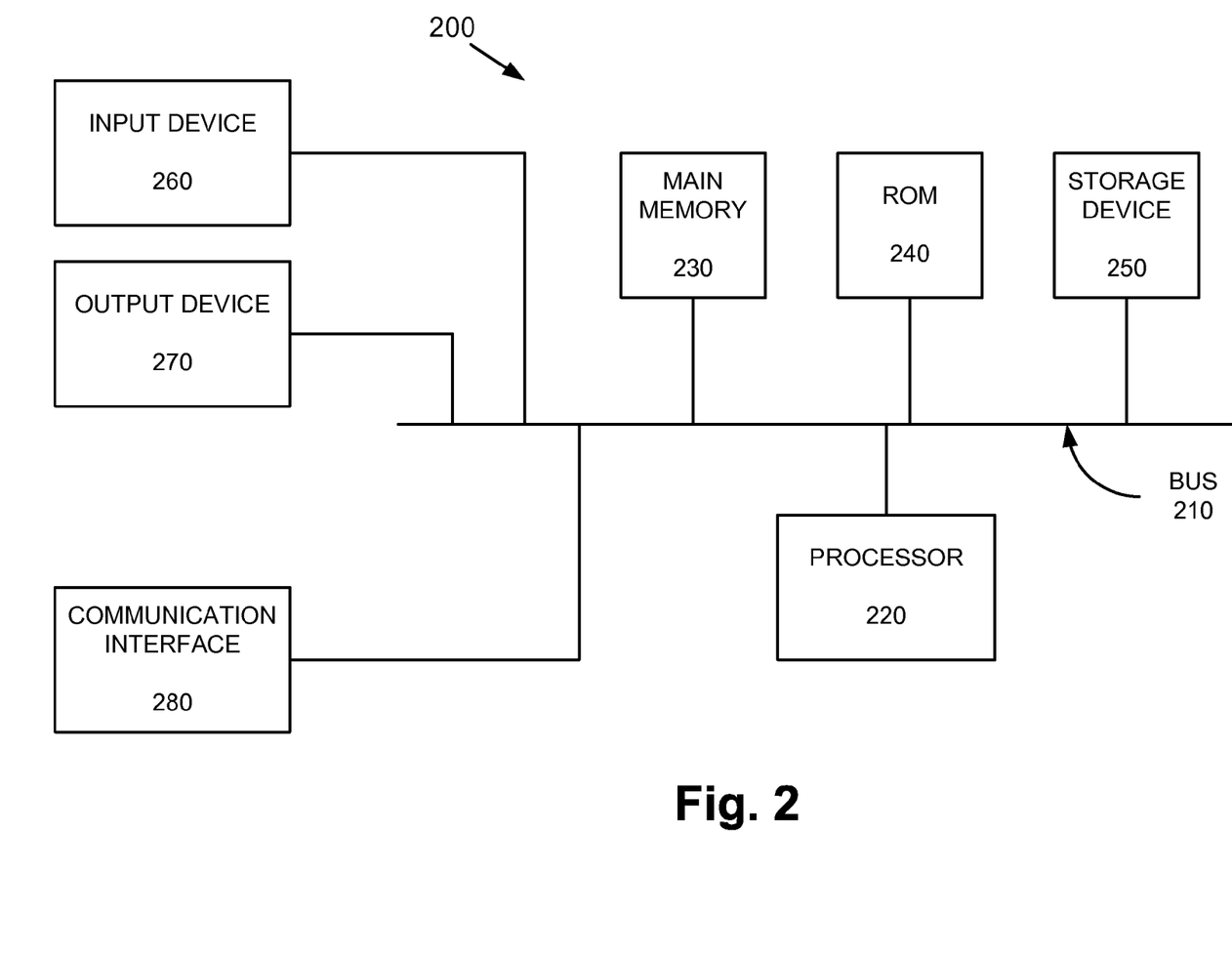
FIG. 2 is a block diagram of exemplary components of a network device.

FIG. 2 is a block diagram of exemplary components of a network device 200, such as WX 150. As shown in FIG. 2, network device 200 may include a bus 210, a processor 220, a main memory 230, a read only memory (ROM) 240, a storage device 250, an input/output device 260, and a communication interface 270. While FIG. 2 shows particular components of network device 200, network device 200 may include different and/or differently arranged components in other implementations.

Bus 210 may include a path that permits communication among the components of network device 200. Processor 220 may include a processor, a microprocessor, an application specific integrated circuit (ASIC), a field programmable gate array (FPGA), or another type of processor that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include non-volatile storage such as a magnetic storage medium, such as a hard disk drive, or a removable memory, such as a flash memory.

Input/output device 260 may include a mechanism that permits an operator to input information to network device 200, such as a control button, and/or a mechanism that outputs information to the operator, such as a light emitting diode or some form of display. Communication interface 270 may include any transceiver-like mechanism that enables network device 200 to communicate with other devices and/or systems. In one implementation, communication interface 270 may include one or more ports, such as Ethernet ports, via which data may be received and/or transmitted.

Network device 200 may perform certain operations, as described in detail below. Network device 200 may perform these operations in response to processor 220 executing software instructions contained in a computer-readable medium, such as memory 230. A computer-readable medium may be defined as a physical or logical memory device.

The software instructions may be read into memory 230 from another computer-readable medium, such as data storage device 250, or from another device via communication interface 270. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Exemplary Operating System Upgrade Procedure

As previously mentioned, an administrator of network device 200 may occasionally wish to upgrade the software associated with network device 200. For example, the manufacturer of network device 200 may have released a software upgrade that fixes bugs or adds additional functionality to network device 200. In some implementations, network device 200 may be configured to automatically contact the manufacturer and perform upgrades as needed. In other implementations, the administrator may manually download and initiate the installation of updates.

Figure 3:
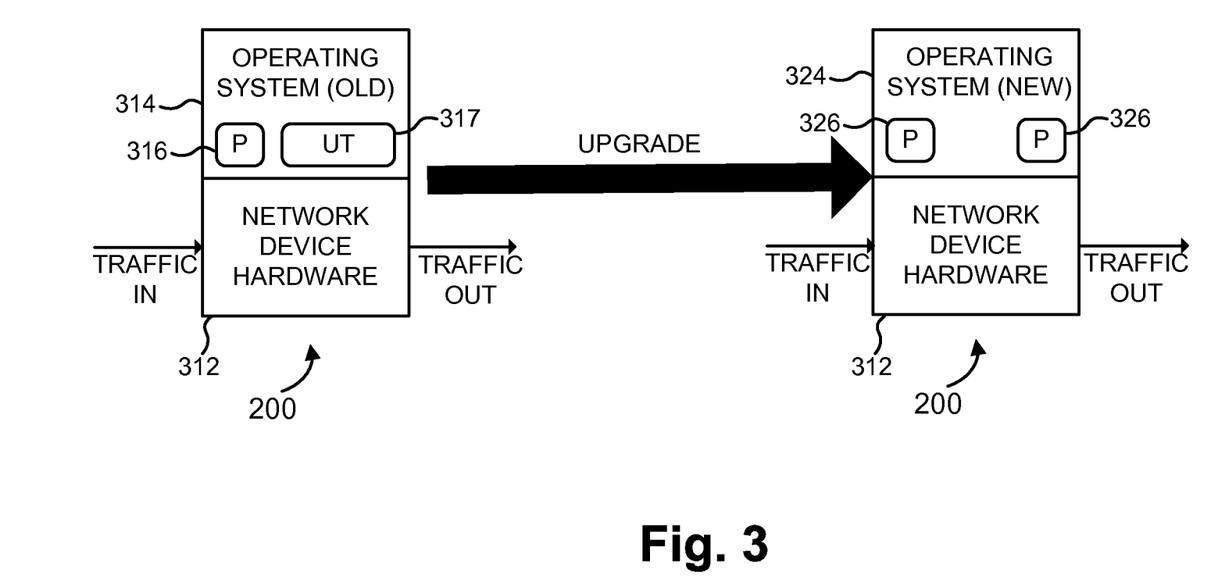
FIG. 3 is a diagram conceptually illustrating an exemplary upgrade process.

As described herein, the operating system (OS) for network device 200 may be upgraded. In one implementation, upgrading the OS may be performed without taking the network device offline. FIG. 3 is a diagram conceptually illustrating an exemplary upgrade process.

Network device 200 is shown in FIG. 3 before and after upgrade processing. Network device 200 may include network device hardware 312 and an operating system (OS) 314. Hardware 312 may represent, for example, processor 220, communication interface 280, and potentially other hardware shown in FIG. 2. Hardware 312 may also include special purpose hardware, such as Application Specific Integrated Circuits (ASICs), designed to efficiently process network traffic. OS 314 may represent software responsible for the management and coordination of processes, such as processes (P) 316, that use hardware 312. OS 314 may be the old version of that OS that is to be replaced with a new, different OS. Processes 316 may be processes that run under OS 314. Processes 316 may, for instance, be responsible for implementing various aspects of the functionality provided by network device 200. One of processes 316 may be an upgrade tool (UT) 317 that assists in performing software upgrades to network device 200.

After upgrading the OS, network device 200 may include the new OS 324. N new processes 326, compatible with new OS 324, may also be installed as part of the upgrade process. In one implementation, the upgrade process may be performed in a way that does not require disconnecting network device 200 from the network. For instance, network device hardware 312 may be placed in "pass through" mode before upgrading, in which received traffic is simply passed through network device 200 in a way that can be handled exclusively by hardware 312 without direction from the OS or the OS processes.

Figure 4:
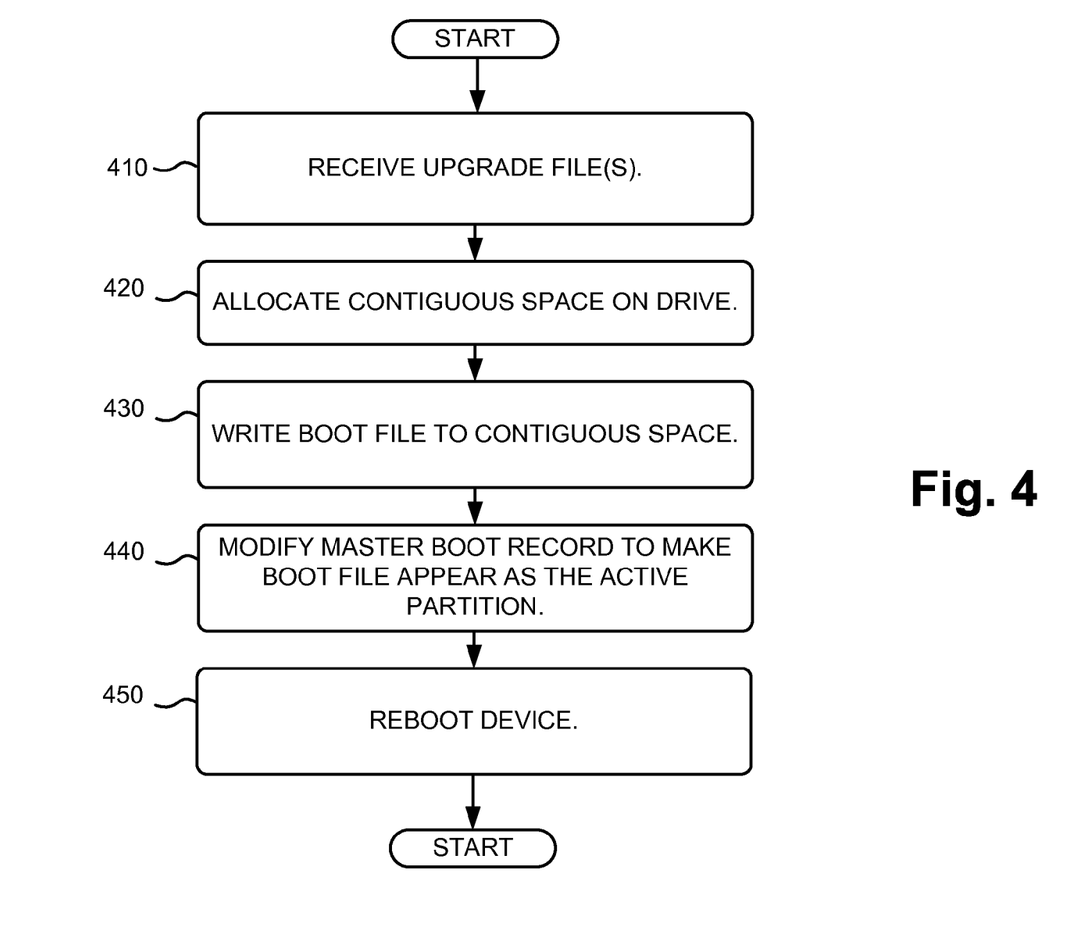
FIG. 4 is a flow chart illustrating exemplary operations for a first stage of the upgrade process of FIG. 3.

The upgrade process described herein may be performed in two stages: (1) a first stage performed using software tools running under old OS 314, (2) and a second stage performed using software tools running under new OS 324. FIG. 4 is a flow chart illustrating exemplary operations for the first stage of the upgrade process.

As shown in FIG. 4, files or other data structures required for performing the upgrade may be received (block 410). The files may include, for example, upgrade tool 317 and a file that includes a bootable image of an operating system, such as a simplified version of new OS 324, referred to as a recovery OS herein. Upgrade tool 317 may be executed by old OS 314.

Upgrade tool 317 may allocate contiguous space on a bootable drive being used by network device 200 (block 420). The contiguous space may be allocated to be large enough to hold the bootable image that was received as part of the reception of the upgrade files in block 410. In some situations, the contiguous space may additionally include space allocated to padding in order to sector align the start and end address of the contiguous space.

Figure 5:
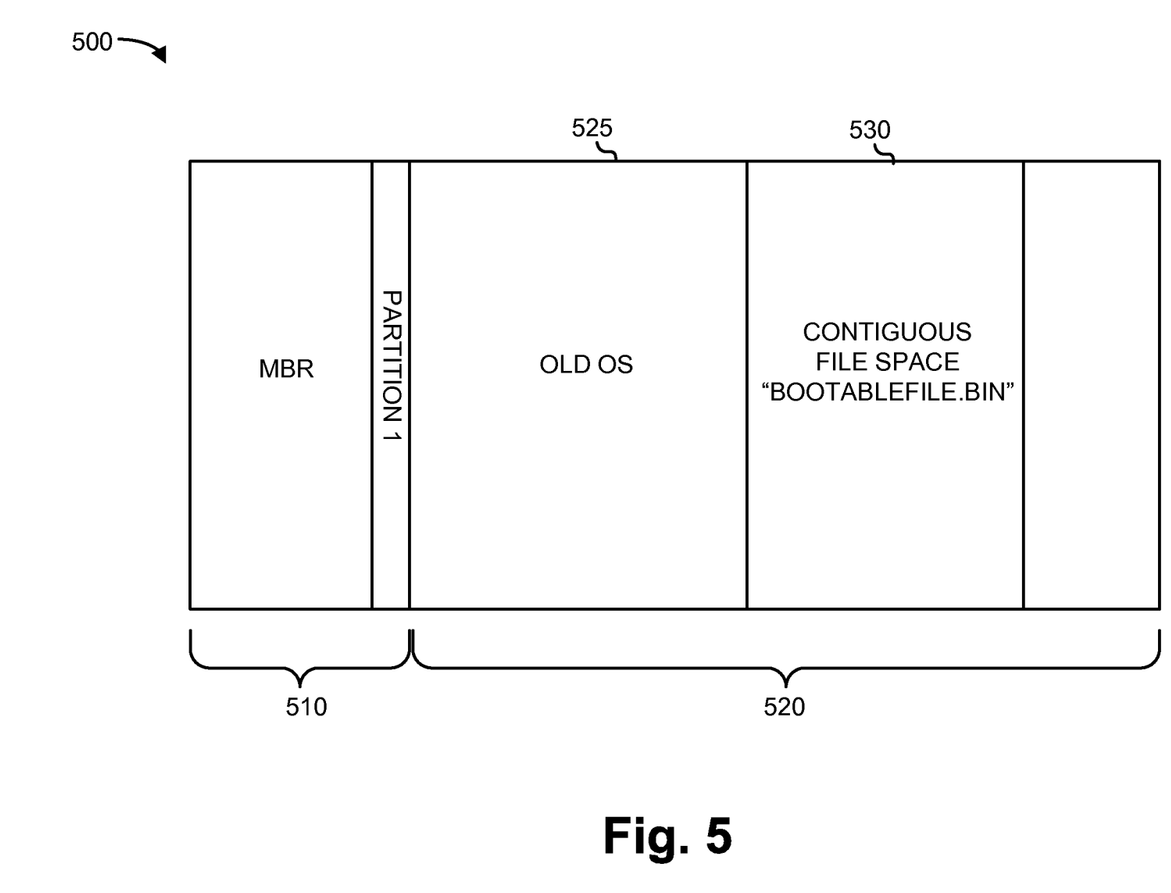
FIG. 5 is a diagram illustrating the exemplary allocation of contiguous space on a drive.

FIG. 5 is a diagram illustrating the exemplary allocation of contiguous space on a drive, as performed in block 420. In FIG. 5, a drive 500 is illustrated. Drive 500 may be, for example, a hard disk drive or a flash drive from which network device 200, when initially turned-on, may initialize itself (i.e., boot up). Drive 500 may be formatted to a first file system format, such as the "FAT16" format. The file system format used by the new OS may be a different file system format, such as "EXT3."

Drive 500 may include a master boot record (MBR) 510 and a single partition 520. A master boot record is a standardized data structure stored in the first sector of a partitioned storage device. MBR 510 may include a 512-byte table ("partition table") that includes information such as the signature of a drive and the location and sizes of the partition(s) on the drive. In this example, MBR 510 may include information describing partition 520, such as the partition length and the partition start address. In operation, when network device 200 is initially turned-on, network device 200 may read MBR 510 to determine the location of a bootable partition. Network device 200 may then begin executing the operating system based on machine code stored in the partition.

In partition 520, "old OS" 525 may represent the machine code used to load old OS 314. Upgrade tool 317 may be an application running under the old OS and may allocate contiguous file space 530 in partition 520. In one implementation, upgrade tool 317 may use tools available through the old OS to allocate the contiguous file space. For example, under the real-time operating system VxWorks, the "ioctl" function may be used to allocate contiguous file space 530. Contiguous file space 530 may be created so that the first address of contiguous file space 530 is sector aligned to drive 500.

Returning to FIG. 4, upgrade tool 317 may next write the bootable image file to the contiguous file space that was previously allocated (block 430). In FIG. 5, contiguous file space 530 is shown as including the bootable file "bootablefile.bin". The bootable file may be a binary file encoded to use the file system format of new OS 324 (e.g., EXT3). In some implementations, upgrade tool 317 may also need to obtain the start sector address or the logical block address (LBA) of "bootablefile.bin." One technique for doing this may include "walking" the file system until "bootablefile.bin" is found.

Upgrade tool 317 may next modify MBR 510 so that contiguous file space 530 appears as the active (primary) partition in MBR 510 (block 440). The starting sector address or LBA of "bootablefile.bin" may be used in modifying MBR 51. MBR 510 may be further modified so that the previous active partition appears as a second partition. The new partition created for contiguous file space 530 may not be a "real"

partition in the sense that it is simply a file contained within the original primary partition 520 and still formatted using the file system format of old OS 314.

Figure 6:
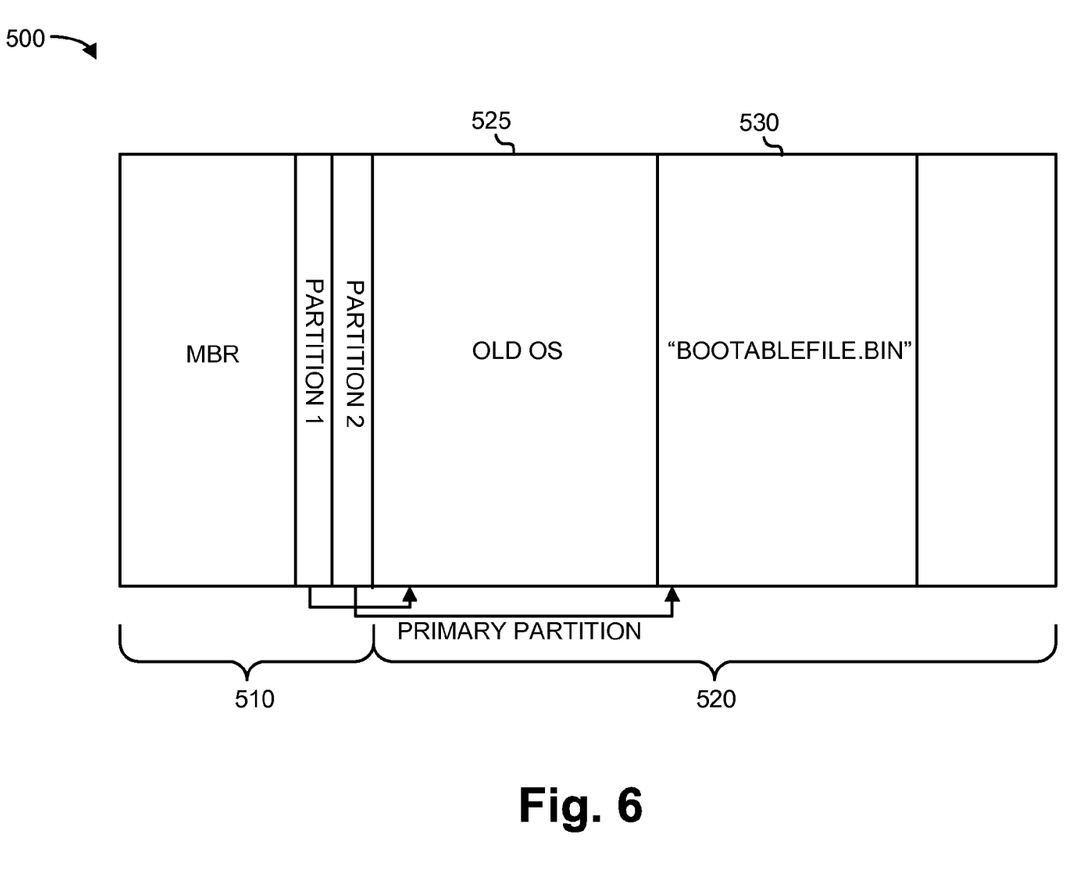
FIG. 6 is a diagram illustrating an exemplary state of the drive shown in FIG. 5 after modification of the master boot record.

FIG. 6 is a diagram illustrating an exemplary state of the drive shown in FIG. 5 after modification of MBR 510 to create a new primary partition. As shown, "bootablefile.bin" now corresponds to the active partition and thus includes the machine code that will be initially loaded when network device 200 is initialized. Old OS 525 may still correspond to a partition. Because of the modification to MBR 510, drive 500 may appear to network device 200 as if it contains two partitions. Contiguous file space 530 may be set in MBR 510 to appear as the active partition while old OS 525 may be set in MBR 510 to appear as another partition.

In one implementation, modifying the master boot record in block 440 may include making a backup of the original MBR, modifying the partition table in the MBR to include two partitions, and verifying the contents of bootablefile.bin. Upgrade tool 317 may additionally set a bootable flag for the newly created primary partition in MBR 510 and install a bootloader program (i.e., a program used to begin loading an OS).

Upgrade tool 317 may next initiate a reboot (restart) of network device 200 (block 450). On reboot, network device 200 may read MBR 510, determine that the address of disk 500 beginning at contiguous file space 530 begins the active partition, and begin loading and executing the machine code at this address. In this manner, the recovery kernel for the new OS may be loaded. In one particular implementation, the new OS may be a linux-based OS.

In one implementation, as previously mentioned, in which network device 200 is a WAN accelerator device, network device 200, during reboot, may be placed in a "pass-through" mode in which incoming traffic is passed through the network device by network device hardware 312. In pass-through mode, the new OS may be installed without blocking traffic.

Figure 7:
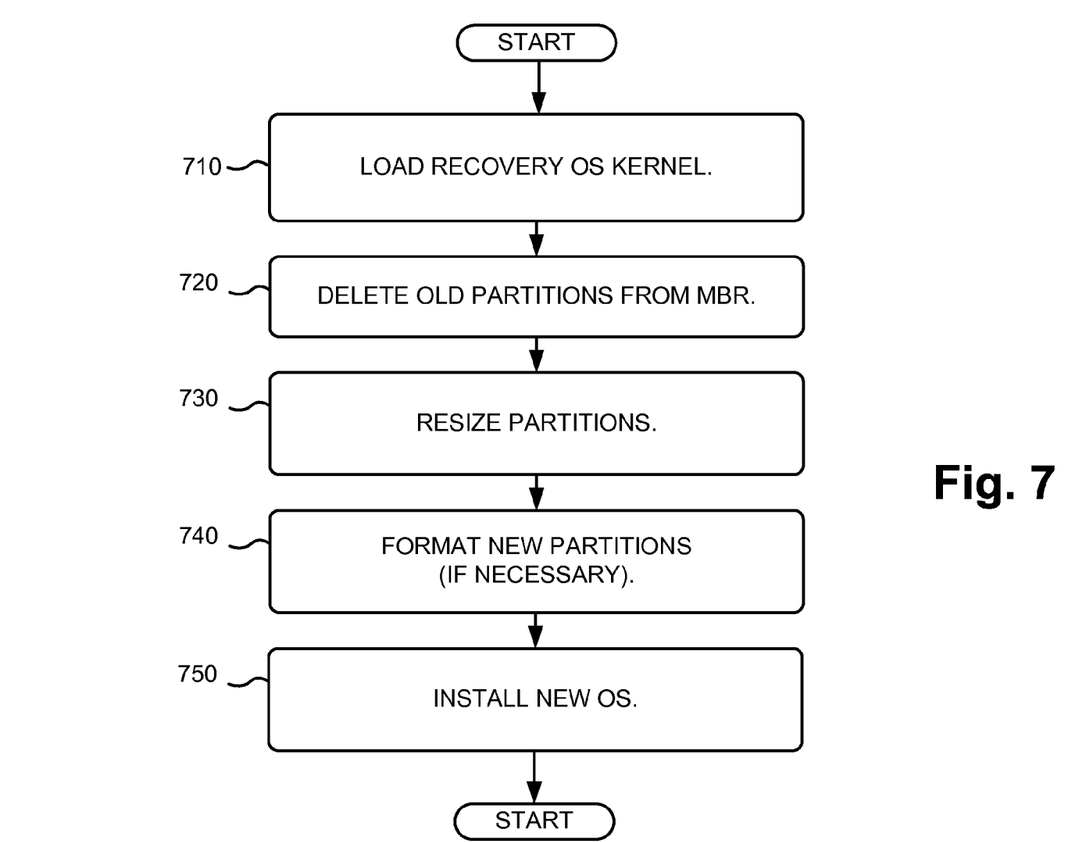
FIG. 7 is a flow chart illustrating exemplary operations for installing a new operating system after a reboot of the network device.

FIG. 7 is a flow chart illustrating exemplary operations for installing new OS 324 after a reboot of network device 200. At reboot, the bootable file in the new active partition may be executed, which may effectively load the kernel for a recovery OS (block 710). The recovery OS may be a modified version of the new OS, such as a minimal version designed to load new OS 324 and its processes 326. In one implementation, in which new OS 324 is a linux-based OS, loading of the recovery OS may be performed by first loading the known "GRUB (Grand Unified Bootloader)" bootloader program, which may start the recovery kernel.

The recovery kernel may reorganize drive 500 into a format used by new OS 324. Reorganizing drive 500 may include deleting old partitions from MBR 510 (block 720), resizing partitions (block 730), and formatting the new partitions when necessary (block 740).

Old partitions, such as partitions corresponding to contiguous file space 530 may be deleted from MBR 510 (block 720). This may be necessary because partitioning tools may not work on the overlapping partition definitions that were previously written to MBR 510.

In one implementation, new OS 324 may use a number of partitions. For example, new OS 324 may use two or three partitions, which may include: (1) a first partition used to store an initial bootloader and a recovery kernel, and (2) a second partition containing a primary image of new OS 324. In some implementations, a third partition may also be used to store a secondary (backup) image of new OS 324. The partitions in drive 500 may be resized to make space for the partitions used by new OS 324 (block 730). When possible resizing may be done in a way that does not lose the data. This may be useful to, for example, maintain configuration information or user data across the OS upgrade.

Figure 8:
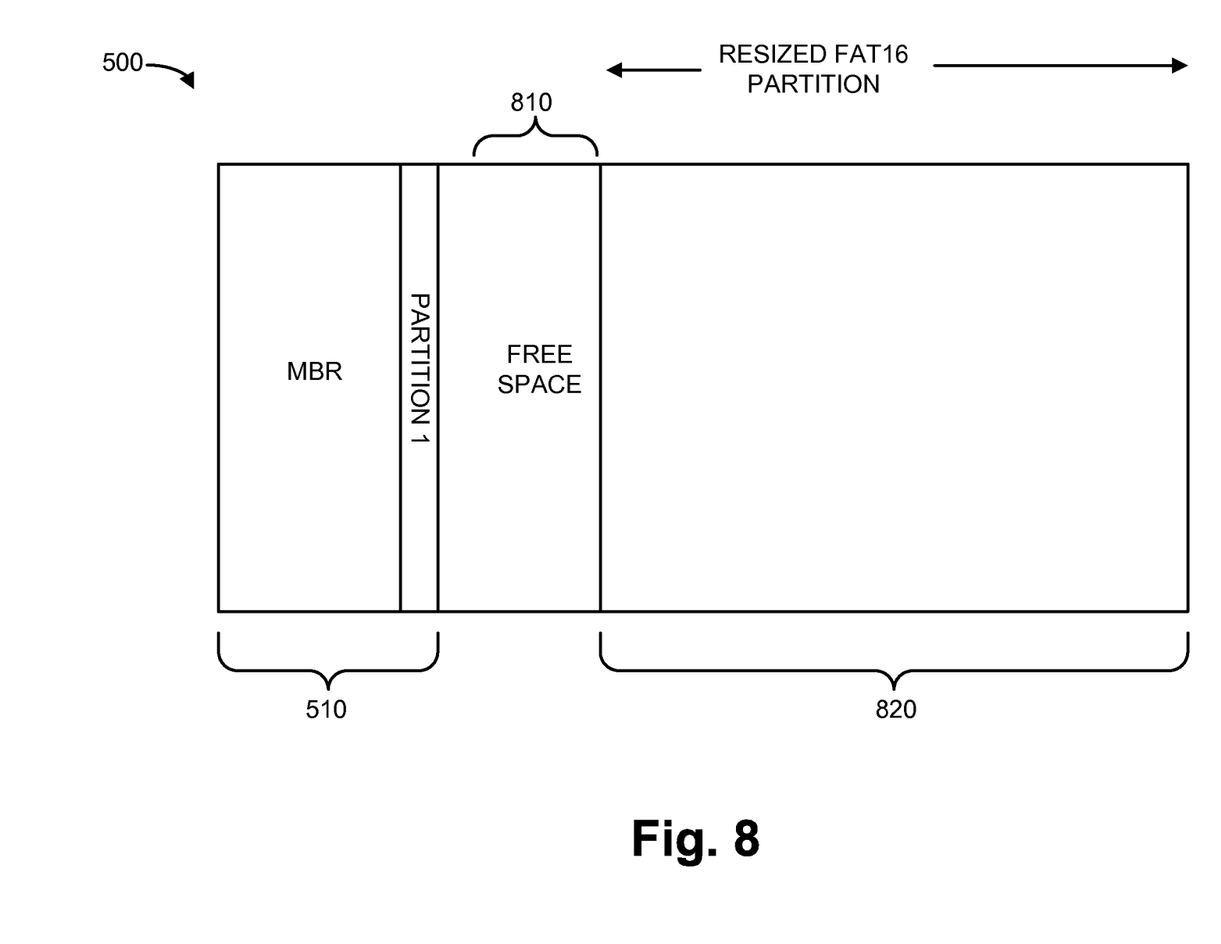
FIG. 8 is a diagram illustrating an exemplary state of the drive after resizing the partitions.

FIG. 8 is a diagram illustrating an exemplary state of drive 500 after resizing the partitions. The original partition 520 (FIG. 6) may be resized to include free space 810 that will be used for a new partition and the remaining space 820, which will be used to create a second partition for new OS 324. At this point, drive 500 may still be formatted using the drive file system format corresponding to old OS 314 (e.g., FAT16).

Figure 9:
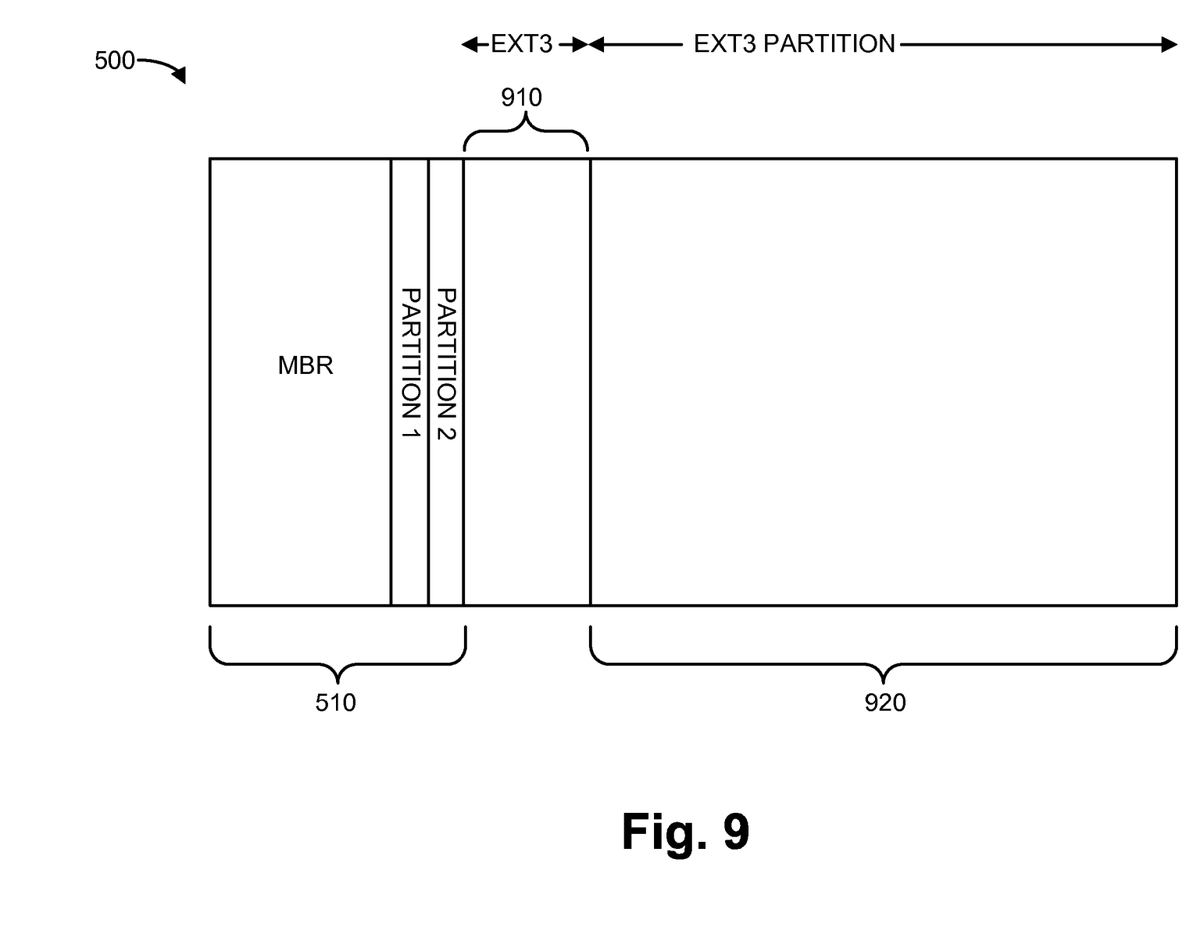
FIG. 9 is a diagram illustrating an exemplary state of the drive after reformatting.

The new partitions (e.g., free space 810 and remaining space 820) on drive 500 may be formatted to the file format used by new OS 324, such as the EXT3 file format (block 740). FIG. 9 is a diagram illustrating an exemplary state of drive 500 after reformatting. At this point, drive 500 includes the two partitions 910 and 920, which may both be formatted according to the file system format of new OS 324 (e.g., EXT3). MBR 510 may also be modified to indicate the presence of partitions 910 and 920.

New OS 324 may next be installed (block 750). New OS 324 may be installed in the newly created partitions 910 and 920. The installation of new OS 324 may be performed by the recovery kernel, operating from memory of network device 200.

Figure 10:
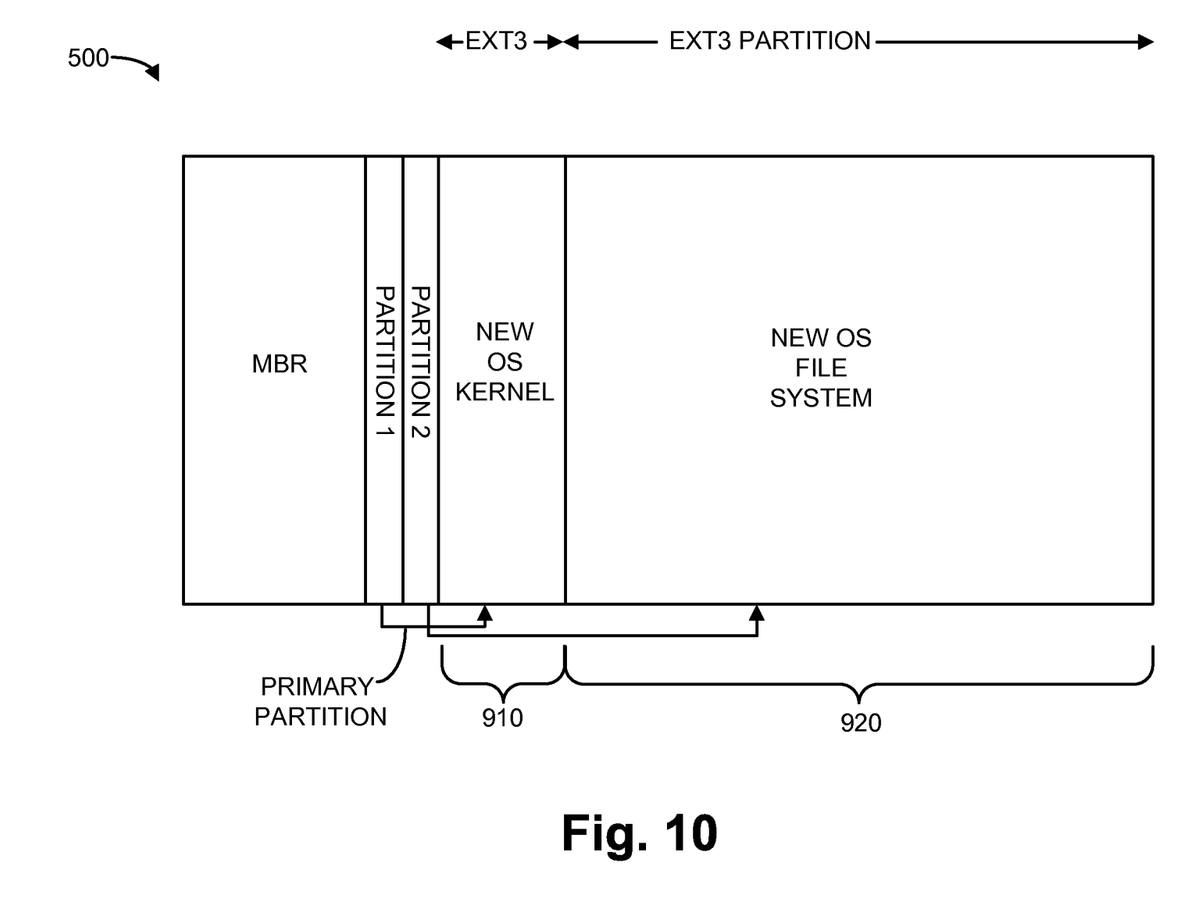
FIG. 10 is a diagram of the drive illustrating an exemplary installation of the new operating system.

FIG. 10 is a diagram of drive 500 illustrating an exemplary installation of new OS 324. In this example, the kernel for new OS 324 is written to the active partition, partition 910. Additional files, such as configuration files and files that implement processes 326, may be stored in second partition 920.

As described above, an upgrade process may include software updates for a network device in which the operating system may be automatically updated.

CONCLUSION

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 4 and 7, the order of the blocks may be modified in other implementations. Further, non-dependent blocks may be performed in parallel.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A method comprising:
   receiving, by a network device, a bootable image file of a first operating system that is different from a second operating system being run by the network device,
      a first file system format of the first operating system being different from a second file system format of the second operating system, and
      the bootable image file including a binary file format that conforms to the first file system format;
   allocating, by the network device, contiguous space on a drive of the network device,
      the contiguous space having a size at least equal to a size of the bootable image file, and
      the drive being formatted according to the second file system format;
   copying, by the network device, the bootable image file to the contiguous space on the drive of the network device;
   modifying, by the network device, a master boot record of the drive of the network device to indicate, in the master boot record, that the contiguous space on the drive of the network device is a bootable partition of the drive of the network device;
   placing, by the network device, hardware of the network device into a pass-through mode that allows traffic to pass through the network device without direction from the second operating system; and
   causing, by the network device, the network device to reboot to load the first operating system.

2. The method of claim 1, further comprising:
   creating one or more new partitions on the drive of the network device; and
   reformatting the one or more new partitions to use the first file system format of the first operating system.

3. The method of claim 2, further comprising:
   installing the first operating system in the one or more new partitions.

4. The method of claim 2, further comprising:
   updating the master boot record to reflect the one or more new partitions.

5. The method of claim 1, where the hardware includes a wide area network (WAN) accelerator.

6. The method of claim 1, where allocating the contiguous space on the drive of the network device includes:
   allocating the contiguous space to be aligned with a sector boundary of the drive of the network device.

7. The method of claim 1, further comprising:
   saving a backup of the master boot record before modifying the master boot record.

8. The method of claim 1, where the first operating system includes a linux-based operating system.

9. The method of claim 1, where allocating the contiguous space includes:
   using software tools available through the second operating system to allocate the contiguous space.

10. The method of claim 9, further comprising:
    using, after causing the network device to reboot, other software tools available through the first operating system to complete an upgrade to the first operating system.

11. A non-transitory computer-readable medium storing instructions, the instructions comprising:
    one or more instructions that, when executed by at least one processor of a network device, cause the at least one processor to:
       receive a bootable image file of a first operating system that is different from a second operating system being run by the network device,
          a first file system format used by the first operating system being different from a second file system format used by the second operating system, and
          the bootable image file including a binary file format that conforms to the first file system format;
       allocate contiguous space on a drive of the network device,
          the contiguous space having a size at least equal to a size of the bootable image file, and
          the drive being formatted according to the second file system format;
       copy the bootable image file to the contiguous space on the drive of the network device;
       modify a master boot record of the drive of the network device to indicate, in the master boot record, that the contiguous space on the drive of the network device is a bootable partition of the drive of the network device;
       place hardware of the network device into a pass-through mode that allows traffic to pass through the network device without direction from the second operating system; and
       cause the network device to load the first operating system based on the master boot record.

12. The non-transitory computer-readable medium of claim 11, where the instructions further comprise:
    one or more instructions that, when executed by the at least one processor of the network device, cause the at least one processor to:
       create one or more new partitions on the drive of the network device; and
       reformat the one or more new partitions to use the first file system format.

13. The non-transitory computer-readable medium of claim 12, where the instructions further comprise:
    one or more instructions that, when executed by the at least one processor of the network device, cause the at least one processor to:
       install the first operating system in the one or more new partitions.

14. The non-transitory computer-readable medium of claim 12, where the instructions further comprise:
    one or more instructions that, when executed by the at least one processor of the network device, cause the at least one processor to:
       update the master boot record to reflect the one or more new partitions.

15. The non-transitory computer-readable medium of claim 11, where the hardware includes a wide area network (WAN) accelerator.

16. The non-transitory computer-readable medium of claim 11, where the one or more instructions to allocate the contiguous space on the drive of the network device include:
    one or more instructions that, when executed by the at least one processor of the network device, cause the at least one processor to:
       allocate the contiguous space to be aligned with a sector boundary of the drive of the network device.

17. A network device comprising:
    one or more processors to:
       receive a bootable image file of a first operating system that is different from a second operating system being run by the network device, a first file system format of the first operating system being different from a second file system format of the second operating system;

copy the bootable image file to a contiguous space on a drive of the network device;

modify a master boot record of the drive of the network device to indicate, in the master boot record, that the contiguous space on the drive of the network device is a bootable partition of the drive of the network device;

place the network device into a pass-through mode that allows traffic to pass through the network device during loading of the first operating system; and reboot the network device to load the first operating system based on the master boot record.

18. The network device of claim 17, where the bootable image file includes a binary file format that conforms to the first file system format.

19. The network device of claim 17, where the network device includes a wide area network (WAN) accelerator.

20. The network device of claim 17, where the one or more processors are further to:

create one or more new partitions on the drive of the network device; and reformat the one or more new partitions to use the first file system format.

21. The network device of claim 20, where the one or more processors are further to:

install the first operating system in the one or more new partitions.

22. The network device of claim 20, where the one or more processors are further to:

update the master boot record to reflect the one or more new partitions.

\* \* \* \* \*